United States Patent [19]

Day

[11] 3,909,547

[45] Sept. 30, 1975

[54] MINE PAGING AND TELEPHONE SYSTEM

[75] Inventor: Paul B. Day, Reading, Pa.

[73] Assignee: Gai-Tronics Corporation, Reading, Pa.

[22] Filed: June 14, 1973

[21] Appl. No.: 369,939

Related U.S. Application Data

[63] Continuation-in-part of Ser. No. 210,758, Dec. 22, 1971, Pat. No. 3,783,195.

[52] U.S. Cl................... 179/40; 179/28; 179/18 BF
[51] Int. Cl.$^2$........................................ H04M 13/00
[58] Field of Search..... 179/28, 37, 40, 1 H, 18 BF, 179/1 A, 41 A

[56] References Cited

UNITED STATES PATENTS

| | | | |
|---|---|---|---|
| 3,080,454 | 3/1963 | Wenrich et al. | 179/28 |
| 3,335,227 | 8/1967 | Jackel | 179/2 A |
| 3,555,188 | 1/1971 | Meacham | 179/1 A |
| 3,725,601 | 4/1973 | Jetzt et al. | 179/18 BC |
| 3,783,195 | 1/1974 | Day | 179/28 |

OTHER PUBLICATIONS

Standard Handbook for Electrical Engineers, A. E. Knowlton, McGraw-Hill Book Company, Inc., 1957, p. 534.

*Primary Examiner*—Kathleen H. Claffy
*Assistant Examiner*—Tommy P. Chin
*Attorney, Agent, or Firm*—William J. Ruano

[57] ABSTRACT

A paging and telephone communication system especially useful in mines, comprising circuits that do not store energy by avoiding the use of large capacitors or inductors and by limiting line current to achieve intrinsic safety in a coal mine. The system comprises a plurality of stations interconnected in parallel by a pair of metallic line conductors and dry cell battery of high internal resistance energizing said system. Each station includes a handset comprising a receiver, microphone and "push-to-talk" switch. Each station also includes a handset amplifier controlled by said switch, loudspeaker, loudspeaker amplifier and paging circuit having a paging switch associated with the handset for applying a D.C. bias voltage through said line conductors to complete an energizing circuit to said loudspeakers of another station and to amplify any voice signals appearing in said line conductors. Release of said "push-to-page" switch deactivates said loudspeakers and allows conversation to continue only on said handsets, - the entire system becoming dormant upon release of both said switches. A speaker muting electronic switch network responsive to positive and negative paging bias voltage applied to the line conductors, effects passing of current through a biasing resistor to actuate the speaker amplifier.

2 Claims, 5 Drawing Figures

MINE PAGING AND TELEPHONE SYSTEM

This is a continuation-in-part of my application Ser. No. 210,758, filed Dec. 22, 1971 (now U.S. Pat. No. 3,783,195).

The present invention relates to an intrinsically safe communications system for use in coal mines.

Devices presently being used, and sometimes referred to as mine telephones, are not initially intrinsically safe for coal mines because of certain parts employed which are capable of storing electrical energy in amounts which are sufficient for initiating ignition of the most susceptible mixture of methane-air and coal dust. Under these conditions, it is necessary to take special precautions to safeguard against ignition. Usually two methods may be used; one being the addition of current limiting resistors at appropriate places and the other being the use of a specially designed housing which protects against ignition. The first of the two methods sometimes reduces the efficiency of the device while the second method is safe only so long as the housing is closed, which means special handling for servicing purposes.

An object of the present invention is to eliminate the need for either of these methods and to provide a mine communications system that is truly intrinsically safe for use in coal mines as previously described.

A more specific object of this invention is to overcome the abovenamed disadvantages and to provide a greater margin of safety in the system of devices used for hard-wire type voice communications within a coal mine where methane gas, coal dust and air provide an easily ignitable mixture, by eliminating any parts that are capable of storing electrical energy.

A further object of the invention is to provide a mine page phone that assures immediate contact with any station in the system even during power failure.

Figure 1A:
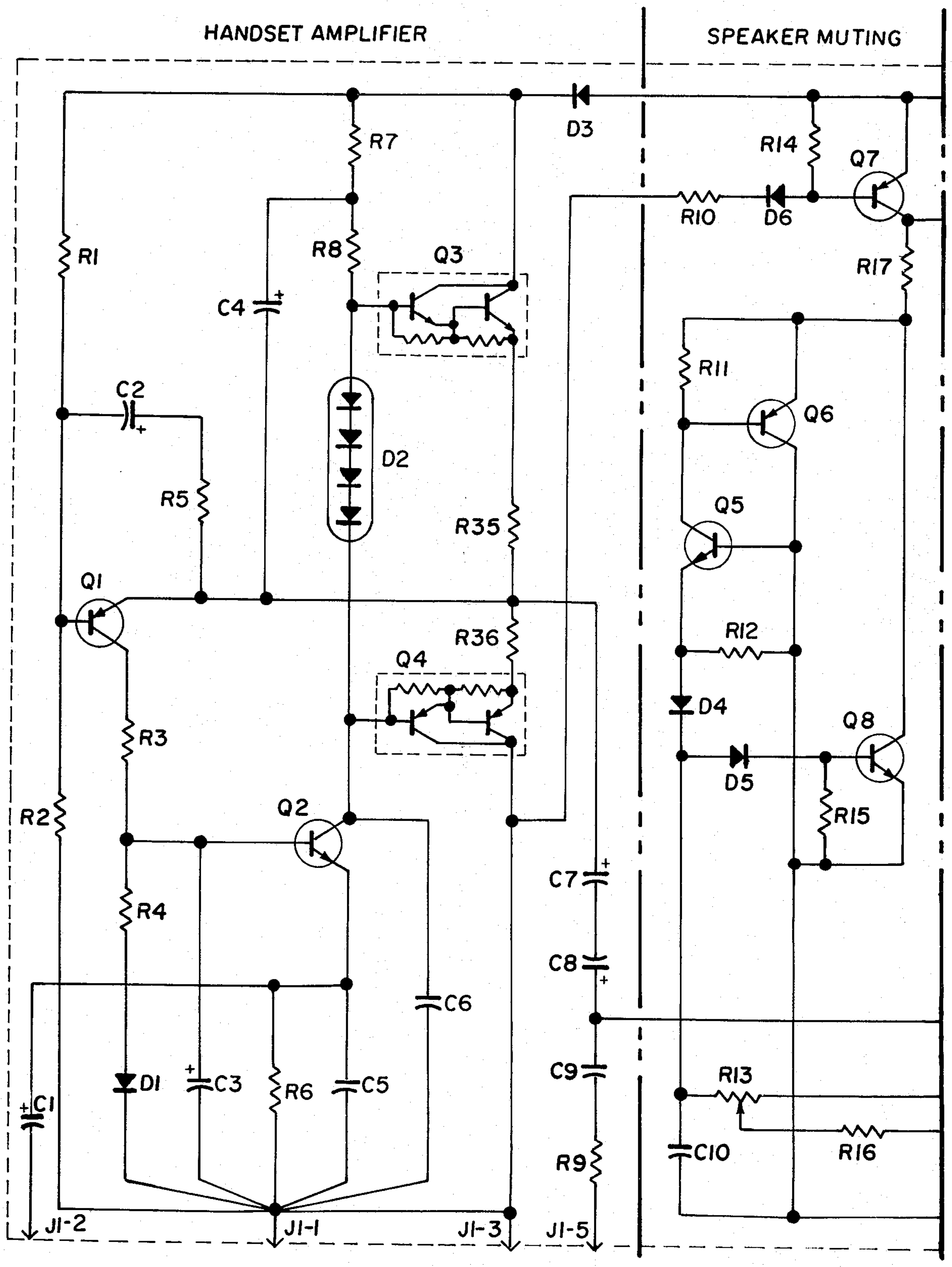
Figure 1B:
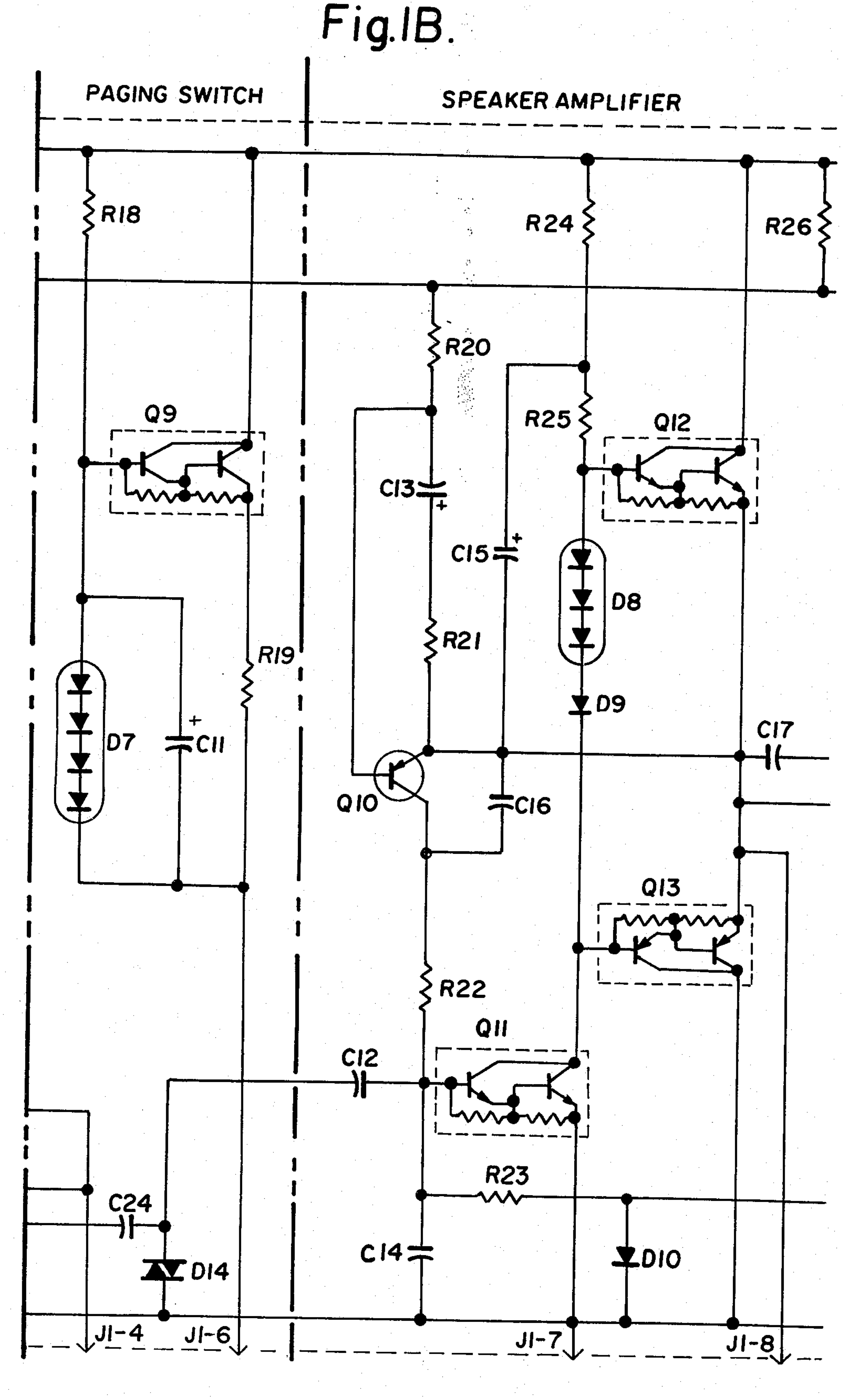
Figure 1C:
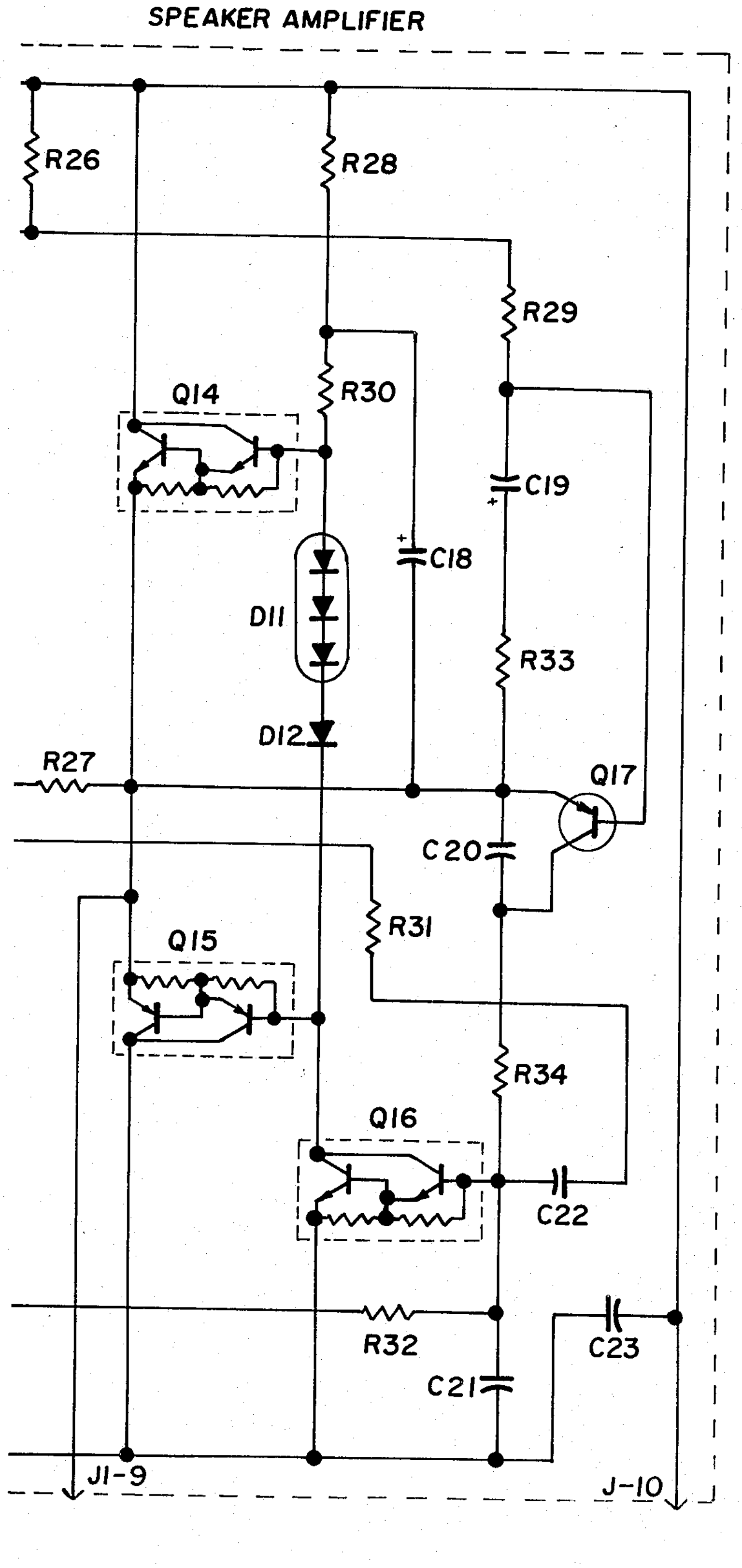
Figure 2:
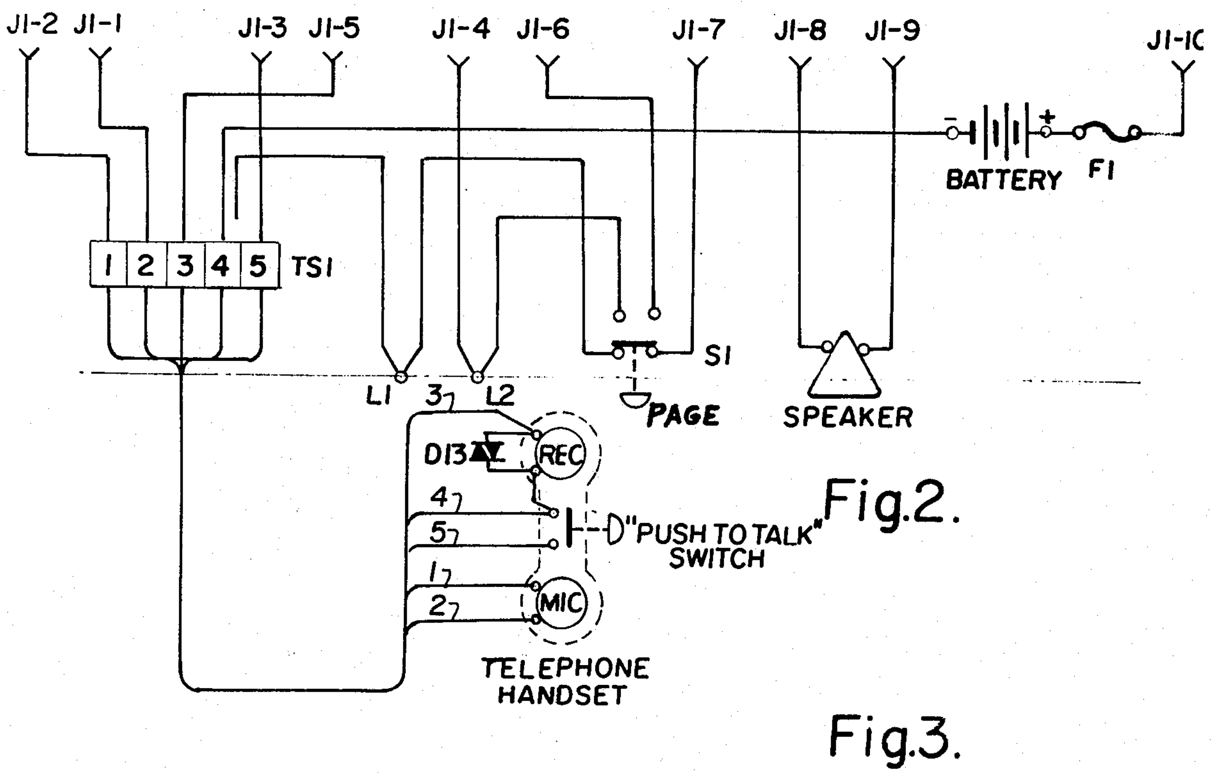
Figure 3:
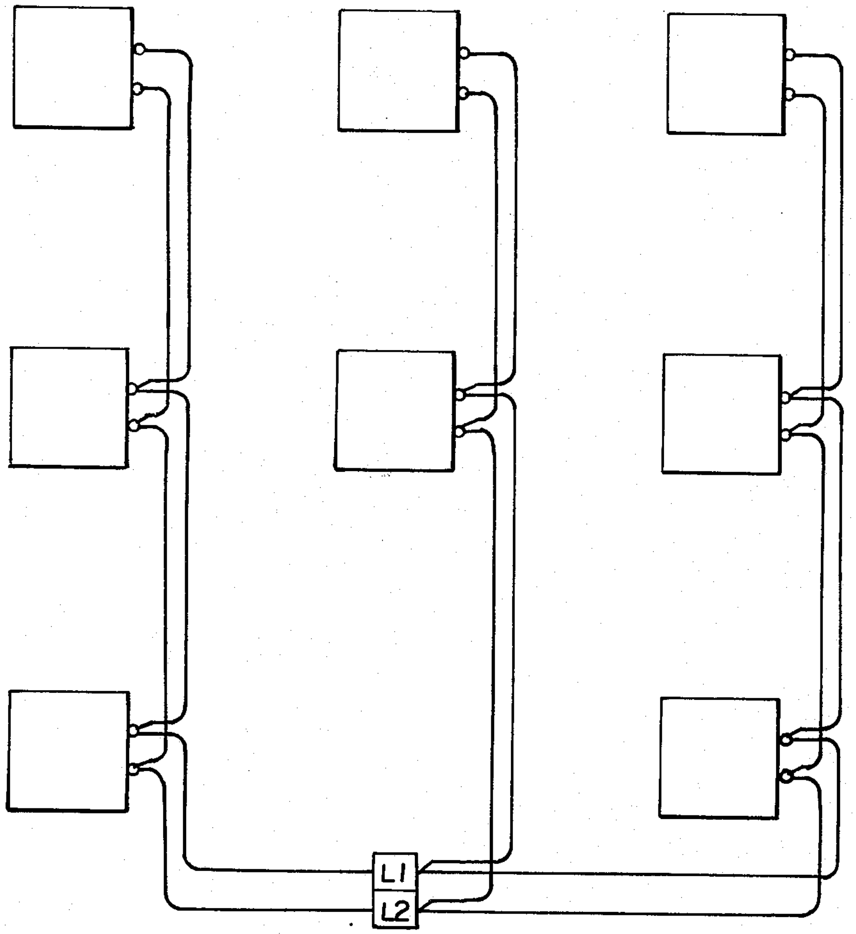

Other objects and advantages will become more apparent from a study of the following description taken with the accompanying drawings wherein:

FIGS. 1A, 1B, 1C and FIG. 2 are component parts of an electric circuit diagram of the mine communication system embodying the present invention; and, FIG. 3 is a block diagram wherein each block represents a station having the circuit shown in FIGS. 1A, 1B, 1C and FIG. 2, which stations are connected in parallel.

It is generally desirable to have a means of paging someone by means of a loudspeaker, and then having that person answer with conversation on a telephone type system. All of this is done on a single pair of wires connected between two or more devices intended for this purpose.

To initiate a call requires a D.C. bias voltage applied to the interconnecting pair of wires. This bias voltage causes all the speaker amplifiers connected to the line to become active and, in turn, amplify any voice signals which appear on the line so long as the bias voltage is present. The person originating the call pushes the Push-to-Page switch to apply the bias to the line. He also pushes the Push-to-Talk switch located on the handset in order that his handset amplifier becomes active, allowing him to converse. Releasing the Push-to-Page switch allows the conversation to continue on handsets only, with the speakers being inactive. The system becomes dormant when all switches are released. A dry cell battery powers both amplifiers and also provides the necessary paging bias voltage.

Broadly stated, the operation of the circuit shown in FIGS. 1A, 1B, 1C and FIG. 2 is as follows:

The two-wire line L1, L2 (FIG. 2) is biased with a D.C. voltage for the purpose of paging and the same pair is used for party line style of conversation by removing the D.C. bias voltage.

The operator depresses a handset Push-to-Talk switch (FIG. 2) while speaking into a noise-cancelling dynamic transmitter MIC which, in turn, drives a handset amplifier (FIG. 1A) of the push-pull series class B type. This amplifier is coupled to the telephone transmission line through a capacitor pair, C7 and C8. The handset receiver REC is connected at all times.

To accomplish a PAGE operation, the operator must depress the Push-to-Talk switch and the Page switch at the same time which puts a D.C. bias on the line through the PAGING SWITCH network and Page Switch S1 (FIG. 2). The PAGING SWITCH circuitry is designed to show an A.C. impedance of about 500 ohms across the transmission line while exhibiting a D.C. impedance of only a few ohms between the battery and the line. The circuit has little phase shift characteristics and almost no electrical storage capabilities. The circuit also limits paging current to about one ampere under shorted line conditions.

The SPEAKER AMPLIFIER (FIGS. 1B and 1C) is driven by the voice signals which appear on the transmission line whenever the D.C. bias voltage is present. This amplifier is similar to two handset amplifiers operating as a "bridge" type amplifier, out of phase with each other. The speaker is connected to the output points of both amplifiers, eliminating the need for a large coupling capacitor.

The speaker amplifier is almost completely inactive when the D.C. bias is removed from the line. Total battery drain in this condition is in the order of 1 or 2 microamperes. When the D.C. line bias of either polarity is applied by some other station, the amplifier is turned on by the circuitry titled SPEAKER MUTING (FIG. 1A). This operation simply applies bias current to the transistors Q5 and Q8 in the amplifier which previously were inactive.

The speaker output power is about 2 to 3 watts, depending upon battery voltage. The handset amplifier output is about 2 to 3 volts into loads as low as 45 ohms.

FIGS. 1A, 1B, 1C and FIG. 2 show portions of a complete diagram of a mine telephone communications system embodying the present invention.

FIG. 1A shows the circuitry of the handset amplifier. Generally stated, it is a series style of push-pull class B complementary symmetry amplifier using direct coupling throughout, excepting the very input and output terminals. The output transistors are high gain Darlington type, used to reduce drive requirements. Signals from the dynamic microphone M (see FIG. 2) are fed through capacitor C1 to the emitter of transistor Q2 which operates in grounded base configuration. Transistor Q2 is the drive stage and it also properly biases output transistors Q3 and Q4. Proper operating voltages are maintained by transistor Q1 in this fashion: Resistors R1 and R2 form a voltage divider which provides the approximate voltage desired at the midway point of transistors Q3 and Q4, the junction of resistors R35 and R36. If this midway point tries to move away from the intended voltage, the emitter of transistor Q1 will also tend to move, which changes the collector current of transistor Q1 and, in turn, the base bias of transistor Q2, thereby readjusting the condition of the amplifier so that the intended voltage at the midway point returns to the desired value.

A.C. signals are not fed back from this point to the base of transistor Q2 because they are by-passed to common by capacitor C3. Signals from transistors Q3 and Q4 are passed to the transmission line L1 and L2 through capacitors C7 and C8. Because the polarity of the paging bias voltage is not predictable, it is necessary to use two polarized capacitors C7 and C8 connected in non-polar fashion. These capacitors prevent the various D.C. voltage conditions from interfering with each other. Diode D1 provides temperature stabilization for transistor Q2. Diode 2 is a four pellet stabistor which provides temperature stabilization for transistors Q3 and Q4. Resistors R35 and R36 provide signal degeneration which reduces distortion. of the output waveform. Capacitor C5 prevents radio frequencies from entering the amplifier. Capacitor C2 and resistor R5 reduce A.C. degeneration in the bias regulating stage, transistor Q1. Capacitor C4 provides the necessary base current required to operate transistor Q3 during the half-cycle that it conducts current.

Signals received from the transmission line are fed to the handset receiver through capacitor C9 and resistor R9 and through line L1 connections through terminal J 1-3 (see FIG. 2). Power for the handset amplifier is applied only when the Push-to-Talk switch (FIG. 2) is depressed. When released, this switch also removes the amplifier from the transmission line L1, preventing the amplifier from loading the line when the amplifier is not being used. Diode D3 allows the amplifier to ride up and down above the positive value of the battery, thereby showing a very high impedance to the line when the Push-to-Talk switch is open. Varistor diode D13 (FIG. 2) is a protective device used to snub transients. This is done to protect the ear of the operator.

FIG. 1A also shows the methods of muting the speaker amplifier when not in use or when the device is being used in the page mode. When not in use, the base bias is removed from the speaker amplifier, causing it to draw no battery current and rendering it inoperative. If the device is used in the page mode, that is, when the operator is paging other devices, it is desirable to turn off his own amplifier so that there will be no acoustical feedback from his loudspeaker to his microphone which would result in squeal. When there is no paging bias on the transmission line, there will be no current flow through diodes D4 or D5 and electronic switch network, comprising transistors Q5, Q6 and Q8, will not turn on; there will be no bias for the speaker amplifier and it will remain inoperative.

Should a positive page bias be applied, diode D5 will conduct, transistor Q8 will turn on, current will flow through resistor R17 and bias will now be applied to the amplifier. Should a negative page bias be applied, transistor Q5 will turn on which turns on transistor Q6 causing current to flow again through resistor R17, supplying bias to the amplifier. Resistor R13 limits the page bias to a value that is non-destructive to the electronic switching circuitry as described. Capacitor C10 bypasses voice signals to common, while allowing the D.C. page bias to go through to the electronic switch.

When the operator is using the device to page other stations, it is necessary for him to close his Push-to-Talk switch and this will cause resistor R10 to be connected to common which turns on transistor Q7 which essentially shorts out the amplifier bias, rendering it inoperative. The speaker amplifier is turned off in this fashion whenever the operator uses his handset amplifier. An additional switch contact on the Page Switch (FIG. 2) removes power from the speaker amplifier whenever the operator pushes this switch.

It should be noted at this point that unlike a relay, very little energy is required to turn on this electronic muting switch and there is practically no stored electrical energy anywhere in the switching circuit.

FIG. 1B shows an electronic impedance to be used in conjunction with the Page Switch. It has a D.C. impedance of only a few ohms, while displaying an A.C. impedance in the order of a hundred times the D.C. impedance. It looks something like an inductor except that it causes no phase shift between current and voltage and it stores very little electrical energy. This electronic impedance also has the added feature of limiting itself to some particular current value, less than one ampere, so that no matter what battery voltage is applied to the circuit, it would not deliver more than one ampere to the transmission line even though the line were short-circuited. The electronic impedance provides a higher voltage just before short circuit conditions than an ordinary resistive circuit would show. This results in good D.C. paging voltage up to the short circuit condition. The reflected A.C. impedance does not noticeably load down the transmission line.

When the Page Switch is actuated and the operator talks, voice signals appear across the transmission line and try to drive the emitter of transistor Q9. The base of transistor Q9 is also being driven by these signals through capacitor C11 and in phase with the emitter. Therefore, all A.C. degeneration is removed and only the collector impedance of transistor Q9 remains, shunted by the impedance of resistor R18. The impedance of resistor R19 is effectively multiplied by the Beta of transistor Q9 and therefore does not appear to be nearly as low in value to the transmission line as it actually is.

Should the page bias current requirement in the transmission line become high, the voltage across diode D7 will cause diode D7 to conduct and very little additional current will flow through the base of transistor Q9. This means that very little additional emitter current will flow, even to the point of short circuit condition. By selecting the value of resistor R19, this short circuit current value can be selected accordingly. The common terminals in FIGS. 1A, 1B, 1C and FIG. 2 are denoted by J 1–1 to J 1–10 inclusive.

FIGS. 1B and 1C illustrate the speaker amplifier. With the dry cell battery connected to the amplifier, the amplifier can assume either of two states. When the speaker muting switch applies transistor bias to the amplifier, it will turn on and amplify signals that appear on the transmission line. In the absence of the transistor bias supplied by the muting switch, the speaker amplifier becomes inactive and is not able to amplify signals. In this condition, the transmission line can be used for telephone mode conversation,- no loudspeakers being involved.

The speaker amplifier is a bridge type push-pull class B complementary symmetry amplifier using direct coupling throughout, excepting the input terminals to each half of the amplifier, where coupling capacitors are used to pass the signal to each half of the amplifier. Transistors Q12 and Q13 of the bridge are interconnected at a first mid-point and transistors Q13 and Q14 of the bridge are interconnected at a second mid-point. The speaker (FIG. 2) is directly connected between said first and second mid-points. For the purpose of explanation, the amplifier will be considered to be turned on with transistor bias being supplied to transistors Q10 and Q17 by the speaker muting switch circuitry. Resistor R26 and R17 form a voltage divider interconnected at a third mid-point, which voltage divider supplies bias to transistors Q10 and Q17 through resistors R20 and R29, respectively to complete a double bridge circuit. Assume that the emitters of transistors Q10, 12, 13, 14, 15 and 17 all normally rest at a voltage point half that of the battery voltage. The bias voltage divider, resistors R26 and R17, should also show about half the battery voltage plus the necessary forward bias voltage for transistors Q10 and Q17 so that they will be in a conducting state. Current will then flow from positive through transistors Q12 and Q10, resistors R22 and R23 and diode D10 to negative. Similarly, bias current for the other half of the amplifier will flow through transistors Q14 and Q17, resistors R34, R32 and diode D10.

At this point, it should be noted that both halves of the amplifier share the same bias divider, Resistors R26 and R17, and the same temperature compensating diode, D10, reducing the number of variables in the bias circuit. It is extremely important to keep the emitters of the speaker output transistors as nearly equal in voltage as possible. It is not enough to simply connect resistors in place of transistors Q10 and Q17. These two biasing transistors operate the same as transistor Q1 operates in maintaining proper bias for the handset amplifier. Since small variations in the output transistor voltage cause large changes in bias current, there results a very accurate biasing system whereby the D.C. voltage applied to each speaker terminal is equal. If one speaker terminal becomes more positive than the other, direct current will flow, for example, through transistor Q12, through the speaker and then through transistor Q15 to negative. This condition is obviously undesirable because of the unnecessary additional battery drain and the additional unwanted heat generated. All of this could be eliminated through the use of a large blocking capacitor in the speaker circuit, but the value of the capacitor needed would invalidate the intrinsic safety feature.

The operation of each half of the amplifier is very similar to that of the handset amplifier, the principal difference being the input configuration which is grounded emitter in the case of the speaker amplifier. Incoming signals appear across resistor R13, the level control, from there through resistor R16, capacitors C24 and C12 to the base of transistor Q11. Varistor diode D14 prevents excessive signals from reaching transistor Q11; they appear instead, across resistor R16. Capacitor C24 prevents the page bias voltage from biasing diode D14 while capacitor C12 prevents the base voltage of transistor Q11 from biasing diode D14. Capacitors C14 and C21 serve to prevent spurious noise and radio frequencies from entering either half of the amplifier. A positive-going signal entering the amplifier through capacitor C12 appears as a negative-going signal of greater amplitude at the emitters of transistors Q12 and Q13. This negative signal is reduced in value by resistor R31 so that it approximates the level of the original incoming signal, and then is fed to the second half of the amplifier through capacitor C22. This is a simple form of phase inversion needed for proper operation.

Capacitor C23 reduces switching transients which may develop from the Page Switch and also provides a low impedance path for any spurious noise and radio frequencies that may prevail; a used battery has a somewhat high internal impedance to radio frequencies. Capacitors C16 and C20 by-pass transistors Q10 and Q17, thereby increasing the A.C. negative feedback, causing a reduction in distortion and an improvement in waveform.

The dry cell battery used to power the complete device is, in itself, incapable of igniting methane-air and coal dust because it has a high internal resistance with respect to other batteries. The loudspeaker is a form of inductor, but the effective inductance in conjunction with this particular battery is not capable of storing enough energy to initiate ignition. Since there are no other parts in the device that are capable of storing energy in sufficient amounts to initiate ignition, the device is, in fact, intrinsically safe with respect to methane-air and coal dust mixtures.

When considering a large system of these devices numbering about one hundred, the page bias current required to turn on all of the speaker amplifiers would be insufficient to cause ignition even when taking into consideration the energy-storing capabilities of the transmission line itself. Therefore, a system using exclusively the type of devices described here would be intrinsically safe with respect to methane-air and coal dust mixtures.

FIG. 3 is a block circuit diagram, each block representing the complete station or circuit illustrated in FIGS. 1A, 1B, 1C and FIG. 2. The stations are all connected in parallel by twisted pairs of wires or two-conductor cable, at least 18 AWG looped between stations.

Thus it will be seen that I have provided a highly efficient paging and telephone system comprising a plurality of stations operable on a single pair of line wires energized by a D.C. battery and wherein loudspeakers of all stations are activated by depressing a paging switch and wherein all receivers are activated by depressing a Push-to-Talk switch,- the circuitry being such that during normal or even short circuit conditions, the maximum current flow does not exceed 1 ampere and no appreciable storage or charge of electrical energy can occur, whereby no possibility exists of initiating ignition of combustible gases.

While I have illustrated and described a single specific embodiment of my invention it will be understood that this is by way of illustration only and that various changes and modifications may be contemplated in my invention and within the scope of the following claims.

I claim:

1. A paging and telephone communication system especially useful in mines, comprising a plurality of stations interconnected in parallel by a pair of metallic line conductors, a dry cell battery energizing said system, each station including a handset comprising a receiver, microphone and a Push-to-Talk switch, each station also including a handset amplifier controlled by said switch, and energized by said dry cell battery, an audio, bridge type speaker amplifier also energized by said dry cell battery and driven by voice signals appearing on said line conductors and comprising a first pair of complementary symmetry transistors connected together at a first mid-point, a second pair of complementary symmetry transistors connected together at a second mid-point, a loud speaker directly connected between said first and second mid-points, a voltage divider comprising a pair of resistors connected together at a third mid-point which is electrically connected to said second mid-point, the other terminals of said speaker amplifier other than those connected to said first, second and third mid-points of said first and second pairs of transistors and of said voltage dividing resistors being connected respectively to said line terminals to provide a double bridge circuit, means for maintaining said first and second mid-points at a constant voltage value, and a paging circuit having a Push-to-Page switch associated with said handset for applying D.C. bias voltage through said line conductors and line conductors of another station to complete an energizing circuit in said other station to a loudspeaker of said other station and to amplify any voice signals appearing in said line conductors, a release of said Push-to-Page switch removing said bias voltage and deactivating said loudspeaker of said other station and allowing conversation to continue only on said handsets of the respective stations, the entire system becoming dormant upon release of both said handset switches, said entire system, including the connection between said first and second mid-points and loudspeaker, being devoid of large capacitors and inductors that store energy in amounts sufficient for initiating ignition, and means for limiting the paging current to less than 1 ampere under short circuit conditions to prevent ignition in an atmosphere of methane-air mixtures and coal dust.

2. A communication system as recited in claim 1 wherein said handset amplifier is a transistor amplifier of the push-pull series Class B complementary symmetry type and is directly coupled to said line conductors through a pair of capacitors connected serially with like polarity interconnecting terminals, and an electronic speaker switching circuit controlled by said Push-to-Page switch and including a transistor and biasing resistor therefor which biases said transistor irrespective of whether a positive or negative biasing voltage appears on said line conductor as the result of closing said Push-to-Page switch.

* * * * *